United States Patent Office 2,998,503
Patented Aug. 29, 1961

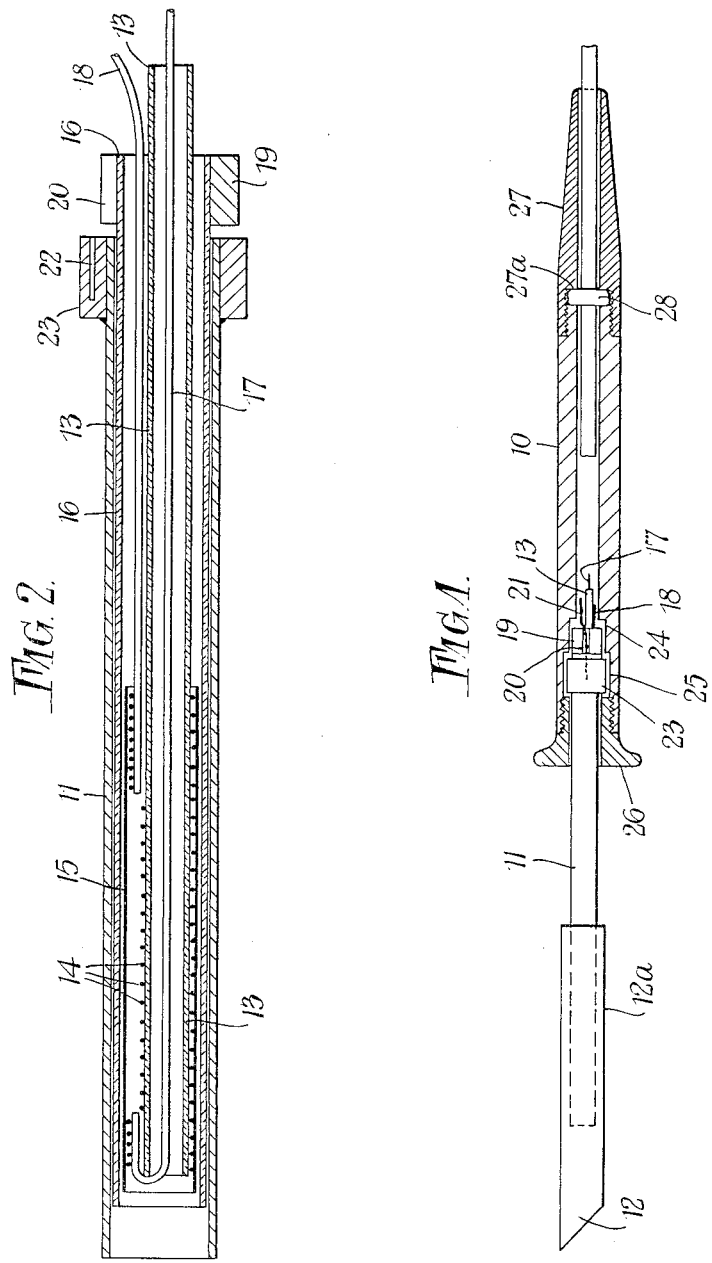

2,998,503
ELECTRICALLY HEATED SOLDERING IRONS
Charles Sydney Richard Wotton, 98 Dominion Road,
Worthing, England
Filed Feb. 1, 1960, Ser. No. 5,781
Claims priority, application Great Britain Mar. 11, 1959
7 Claims. (Cl. 219—26)

This invention relates to electrically heated soldering irons.

According to the invention in a soldering iron including a handle which serves to support a hollow shaft carrying at its outer or free end a soldering bit the hollow shaft is adapted to house a heating unit assembly which comprises an electrical heating coil wound on a core of ceramic material, an insulating sleeve of fibre glass or other equivalent material and an outer sleeve of ceramic material which houses said heating coil and said insulating sleeve, the arrangement being such that the complete heating unit assembly will on assembly of the iron be capable of limited radial and longitudinal movement thereby to minimise the possibility of damage by physical shock. Preferably the electrical supply leads will be arranged to pass through an axial bore in the handle and will be connected directly to the ends of the heating coil. Preferably also the soldering bit applied to the outer or free end of the shaft will be of the push-on type such bit incorporating a split sleeve or skirt portion adapted resiliently to engage around the end portion of said shaft.

In order that the said invention may be clearly understood and readily carried into effect the same will be hereinafter more fully described with reference to the accompanying drawings in which:

FIGURE 1 is a part sectional side elevational view of a soldering iron,

FIGURE 2 is a sectional view on a larger scale, of the shaft and heating element assembly of the iron shown in FIGURE 1.

Referring now to the drawings it will be seen that the iron therein illustrated comprises a substantially cylindrical handle 10 which is formed for example of electrically insulating material such as ebonite and is adapted to support a hollow shaft 11 formed for example of steel, such shaft carrying at its outer or free end a soldering bit 12 which may conveniently be of the push-on type i.e. the sleeve like portion 12a which is adapted to surround the end portion of the shaft 11 may be formed with one or more longitudinally extending slits or the like adapted to impart a degree of resilience to said sleeve portion so that it will engage tightly around said shaft.

The hollow shaft 11 serves to house an electrical heating assembly comprising a tubular core 13 of ceramic material around which a wire 14 constituting the actual heating coil is wound, an insulating sleeve 15 of fibre glass or other equivalent material surrounding said heating coil and finally a sleeve 16 also of ceramic material within which all the aforesaid parts are housed. 17 and 18 denote electrical leads which are connected one to each of the ends of the heating coil such leads being adapted to extend axially through the bore in the handle 10 and to be connected in known manner to a plug or like electrical connector device. Mounted at the inner end of the ceramic sleeve 16 is a bush or collar 19 which is formed for example of electrically insulating material such as ebonite, such bush or collar being conveniently slotted as indicated at 20 to allow passage of an earth wire 21 one end of which latter is introduced into a bore 22 formed on a bush or collar 23 and soldered in position. The bush or collar 23 which is formed of metal such as brass is fixedly secured as by silver soldering to the inner end of the steel shaft 11. It may be mentioned here that in place of the bush or collar 23 the shaft 11 might be suitably flared or flanged.

On assembly of the instrument, as will be seen from FIGURE 1, the bush or collar 19 on the ceramic sleeve 16 will be accommodated in an annular recess 24 in the handle 10 while the bush or collar 23 on the shaft 11 or the flared or flanged portion of such shaft will be accommodated in a larger annular recess 25 the difference in the diameter of the recesses 24, 25 providing an annular shoulder which will serve to locate the shaft on application of a gland nut 26 which is adapted to be threaded into the end of the handle. The construction is such that the bush or collar 19 will be free to float in the space defined by the bush or collar 23 and the recess 24 so that the complete heating unit assembly will be capable of limited radial and longitudinal movements which will minimise possible damage by physical shock.

Preferably those portions of the leads 17, 18 and of the earth wire 21 which extend through the handle 10 to the plug or like connection device and which are themselves covered or encased within a sheath of electrically insulating material will be housed within a common flexible sleeve of plastic or other appropriate electrically insulating material. Preferably also the handle 10 will be provided with a removable end piece 27 which is threaded into position thereon and incorporates a bore of slightly reduced diameter through which the leads will pass. In order to provide a stop which will prevent any undue drawing out of the leads from the handle 10 and hence undesirable strain on the electrical connections a small plastic sleeve or the like 28 may be slid into position on the leads such sleeve or the like being adapted on application of the end piece 27 to be compressed between the end of the handle 10 and the shoulder 27a in the interior of said end piece thereby firmly to grip the leads and to form the desired stop.

I claim:

1. A soldering iron comprising heating means including an insulating axial core, a heating coil on said core, an insulating sleeve encircling said coil, an outer insulating sleeve surrounding said core and first said insulating sleeve, and a hollow sleeve encircling said outer sleeve; a handle, and coupling means detachably coupling said heating means and said handle and enabling limited axial and radial movement therebetween with said handle and heating means coupled.

2. A soldering iron as claimed in claim 1 wherein said heating means includes a soldering bit detachably engageable on said outer sleeve.

3. A soldering iron as claimed in claim 1 wherein said handle is provided with a bore, said soldering iron further comprising electrical leads in said bore and connected to said coil.

4. A soldering iron as claimed in claim 1 wherein said coupling means comprises a collar on said hollow sleeve, a collar on said outer sleeve, said handle being provided with a recess, said collars being loosely in said recess, and a packing gland detachably attached to said handle and adjacent one of the collars for limiting the axial movement thereof.

5. A soldering iron as claimed in claim 4 comprising a ground connector connected to the collar on the hollow sleeve.

6. A soldering iron as claimed in claim 1 wherein said coupling means comprises a packing gland detachably attached to said handle, said handle being provided with an annular recess, said packing gland being adjacent said recess and defining a shoulder therewith, said gland having an axial opening therethrough, said hollow sleeve being coaxially therein, a collar on said outer sleeve and a collar on said hollow sleeve, said collars being in said recess, said collars being axially and radially smaller than said recess whereby said collars are movable axially and radially in said recess.

7. A soldering iron as claimed in claim 1, wherein said insulating axial core and said outer insulating sleeve are of ceramic material and said insulating sleeve encircling said coil is of fibreglass.

References Cited in the file of this patent

UNITED STATES PATENTS

| | | |
|---|---|---|
| 1,553,342 | Vaughan | Sept. 15, 1925 |
| 2,021,732 | Lipsner | Nov. 19, 1935 |
| 2,167,389 | Kuhn et al. | July 25, 1939 |
| 2,761,946 | Bronstein | Sept. 4, 1956 |